(12) United States Patent
Wang (10) Patent No.: US 8,646,667 B2
(45) Date of Patent: Feb. 11, 2014

(54) ROOF RACK DEVICE

(75) Inventor: Lopin Wang, Taichung (TW)

(73) Assignee: BETO Engineering and Marketing Co., Ltd., Taichung (TW)

( * ) Notice: Subject to any disclaimer, the term of this patent is extended or adjusted under 35 U.S.C. 154(b) by 2 days.

(21) Appl. No.: 13/527,878

(22) Filed: Jun. 20, 2012

(65) Prior Publication Data
US 2013/0008931 A1 Jan. 10, 2013

(30) Foreign Application Priority Data

Jul. 5, 2011 (TW) .............................. 100123639 A (51) Int. Cl.
*B60R 9/042* (2006.01)

(52) U.S. Cl.
USPC ............ 224/310; 224/319; 224/321; 224/281

(58) Field of Classification Search
USPC ......... 224/310, 315, 319–321, 325, 326, 281; 414/462
See application file for complete search history.

(56) References Cited

U.S. PATENT DOCUMENTS

| | | | | |
|---|---|---|---|---|
| 2,318,971 A | * | 5/1943 | Roumage et al. ............. | 414/462 |
| 2,469,987 A | * | 5/1949 | Pilsner ............................ | 193/42 |
| 5,360,150 A | * | 11/1994 | Praz ............................... | 224/310 |
| 5,417,358 A | * | 5/1995 | Haselgrove .................... | 224/310 |
| 5,884,824 A | * | 3/1999 | Spring, Jr. ..................... | 224/310 |
| 6,428,263 B1 | * | 8/2002 | Schellens ....................... | 414/462 |
| 6,681,970 B2 | * | 1/2004 | Byrnes ........................... | 224/310 |
| 7,048,490 B2 | * | 5/2006 | Henderson ..................... | 414/462 |
| 7,108,162 B2 | * | 9/2006 | Stadler et al. ................. | 224/310 |
| 2002/0125281 A1 | * | 9/2002 | Byrnes ........................... | 224/310 |
| 2004/0124221 A1 | * | 7/2004 | Stadler et al. ................. | 224/310 |
| 2013/0008931 A1 | * | 1/2013 | Wang ............................. | 224/315 |

FOREIGN PATENT DOCUMENTS

| | | |
|---|---|---|
| TW | 590913 | 6/2004 |
| TW | 200514716 | 5/2005 |
| TW | 200706424 | 2/2007 |

* cited by examiner

*Primary Examiner* — Nathan J. Newhouse
*Assistant Examiner* — Corey Skurdal
(74) *Attorney, Agent, or Firm* — Muncy, Geissler, Olds & Lowe PLLC (57) ABSTRACT

A roof rack device includes a base with a first through hole disposed on a car roof and two carrier members with a second through hole disposed on the base. The base is provided with pin and control members. The control member has a first buckle portion and a cam which pushes the pin member into the first and second through holes or out of the second through hole. The outer end of each carrier member has a lock seat with a second buckle portion. When the first and second buckle portions are engaged, the cam keeps the pin member in the first and second through holes and the carrier members are retracted. When the first and second buckle portions are disengaged, the cam acts on the pin member to disengage from the second through hole and the carrier members can be extended for dismounting the articles.

9 Claims, 8 Drawing Sheets

FIG. 5D

ROOF RACK DEVICE

BACKGROUND OF THE INVENTION

1. Field of the Invention

The present invention relates to a roof rack device, and more particularly, to a roof rack which can be extended outward for the user to mount or dismount articles on the roof rack conveniently.

2. Brief Description of the Prior Art

Taiwan Patent Publication Nos. 200706424 and 200514716 and Taiwan Patent No. 590913 disclose a roof rack to increase space for carrying articles. The roof rack can be used to carry luggage, bicycles, surfboards and the like. In practice, when the user wants to mount or dismount the articles on the roof rack, he/she has to incline their body and reach up to take the articles because the roof rack is too high. Accordingly, it is somewhat difficult to mount/dismount the articles, particularly when the articles are heavy and large in size. Sometimes, the user has to lean on the vehicle for mounting or dismounting the articles, which may dirty his/her clothes. Thus, it is not convenient for the user to operate the roof rack.

Accordingly, the present invention provides a roof rack device for improving the shortcomings mentioned above.

SUMMARY OF THE INVENTION

The primary object of the present invention is to provide a roof rack device. The roof rack device comprises a base transversely disposed on a car roof and two carrier members coaxially disposed on the base. The two carrier members can be extended toward both sides of the vehicle for the user to dismount or mount the articles on the carrier members. There is no need for the user to incline their body and reach up to take the articles. The present invention is therefore very convenient to use.

The base has a first through hole. Each carrier member has a second through hole. The base is provided with a lock unit which comprises a support seat, a pin member and a control member. The support seat has a third through hole disposed under the first through hole. An axle member is provided to connect the control member. The pin member is confined in the third through hole. The control member has a cam which is adapted to push the pin member so that the top of the pin member can be inserted into the first and second through holes or out of the second through hole. The control member further has a first buckle portion. The outer end of each carrier member is provided with a lock seat. The lock seat has a second buckle portion. When the first buckle portion is engaged with the second buckle portion, the cam keeps the pin member inserted in the first and second through holes and the carrier members are retracted and held in place. When the first buckle portion is disengaged from the second buckle portion, the cam acts on the pin member to disengage from the second through hole, and the carrier members can be extended for dismounting the articles. The lock units and the lock seats can help the carrier members be positioned in place quickly. The present invention provides better safety for driving.

DETAILED DESCRIPTION OF THE PREFERRED EMBODIMENTS

Embodiments of the present invention will now be described, by way of example only, with reference to the accompanying drawings.

Figure 1:
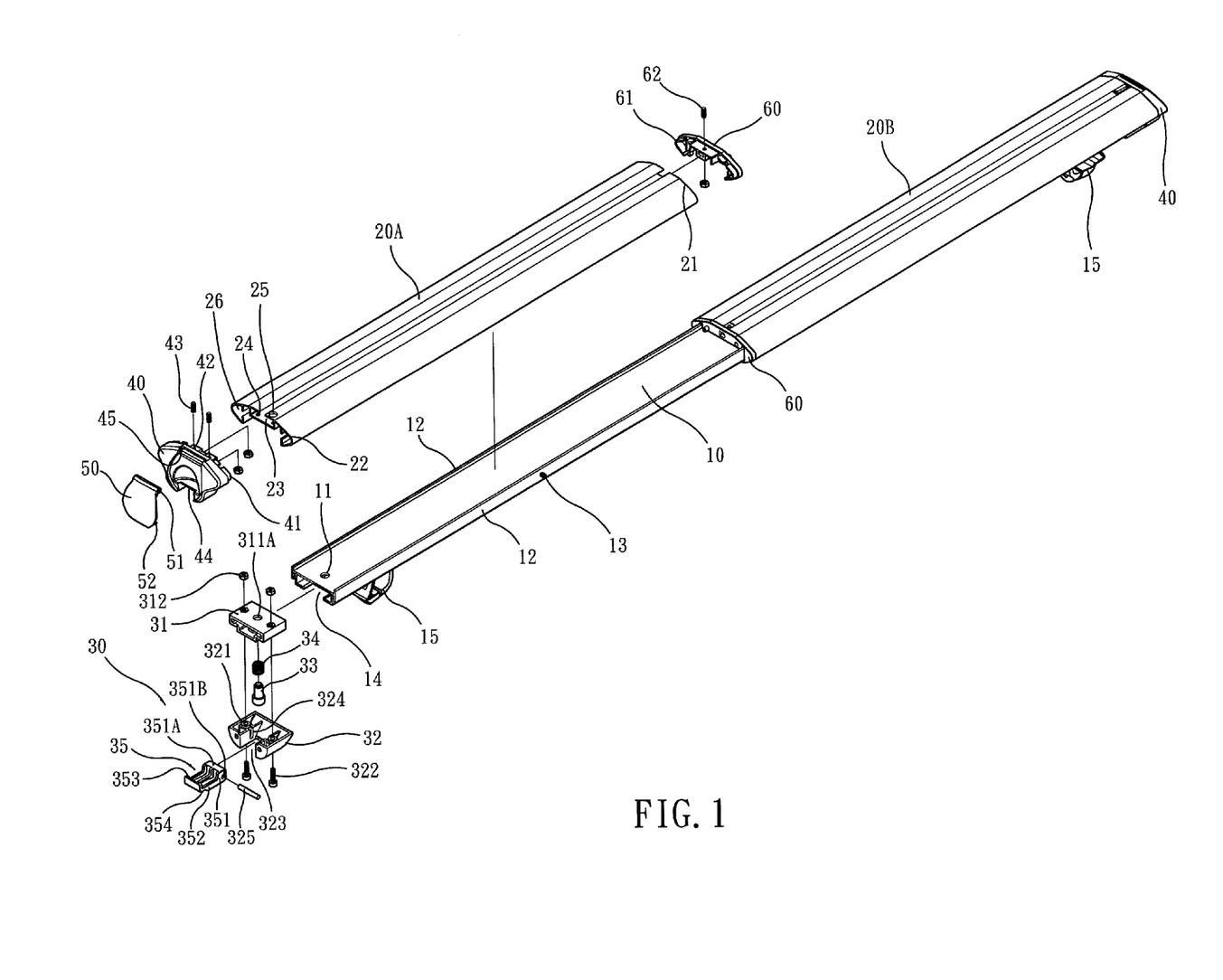
FIG. 1 is an exploded view according to a preferred embodiment of the present invention.
Figure 2:
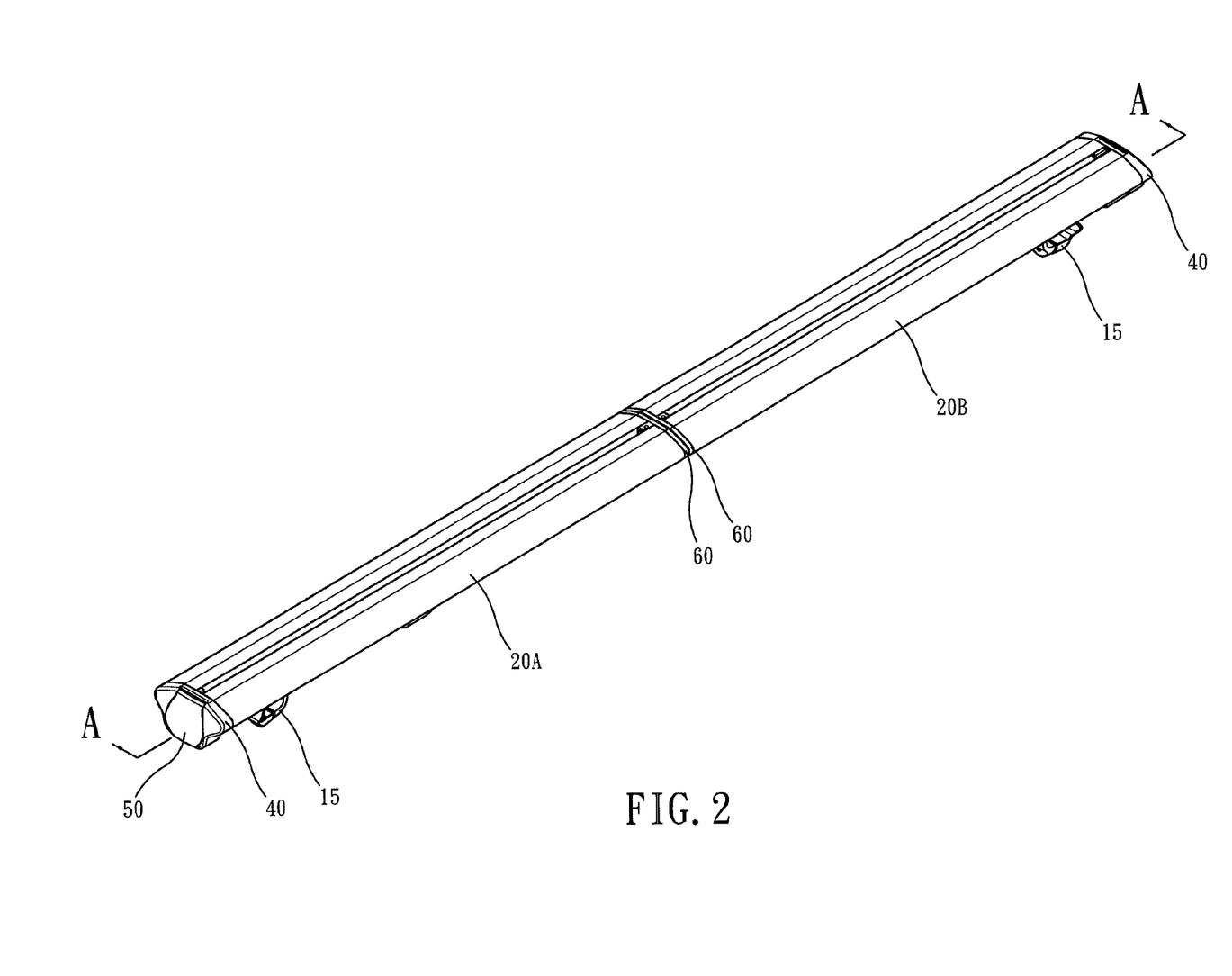
FIG. 2 is a perspective view according to a preferred embodiment of the present invention.
Figure 3:
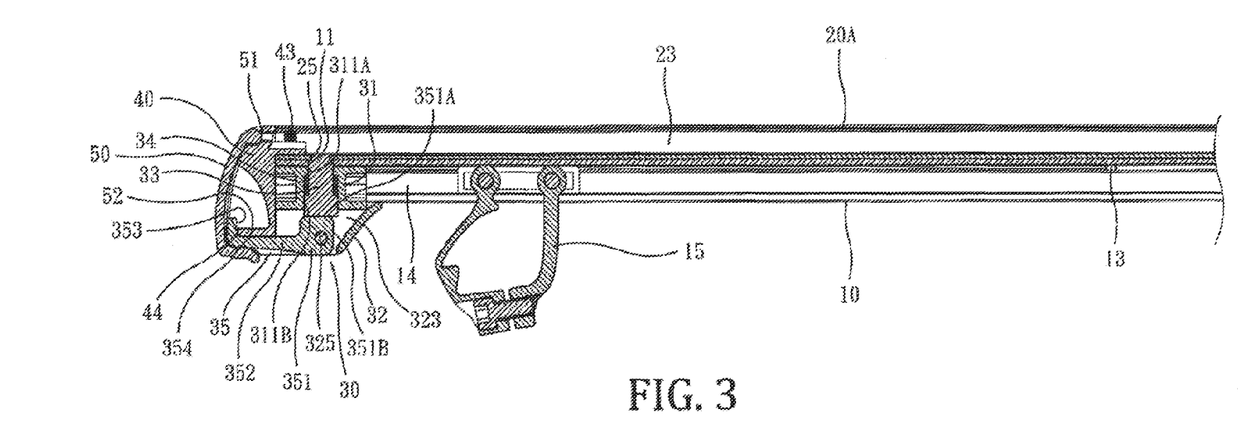
FIG. 3 is a cross-sectional view taken along line A-A of FIG. 2.

As shown in FIG. 1, FIG. 2 and FIG. 3, the roof rack device according to a preferred embodiment of the present invention comprises a base (10), two carrier members (20A, 20B), two lock units (30), two lock seats (40), two movable boards (50), and two protection covers (60).

Figure 5A:
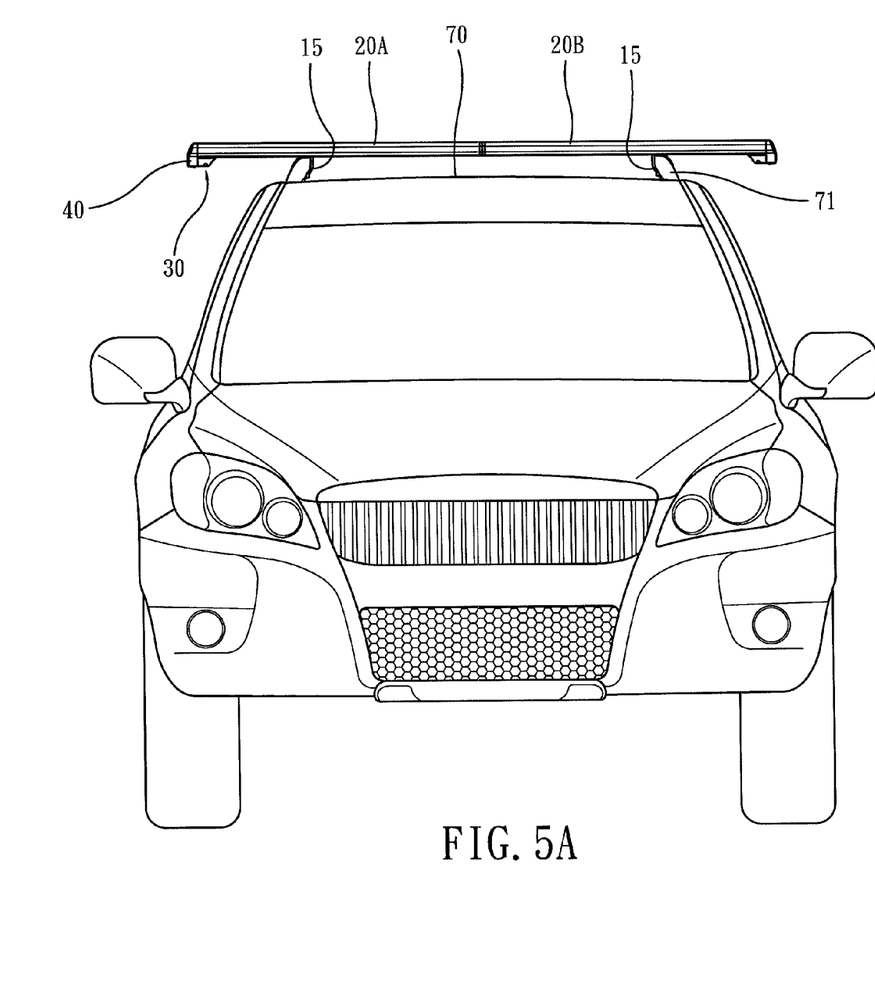
FIGS. 5A, 5B, 5C and 5D are schematic views showing a preferred embodiment of the present invention used to carry articles.
Figure 5B:
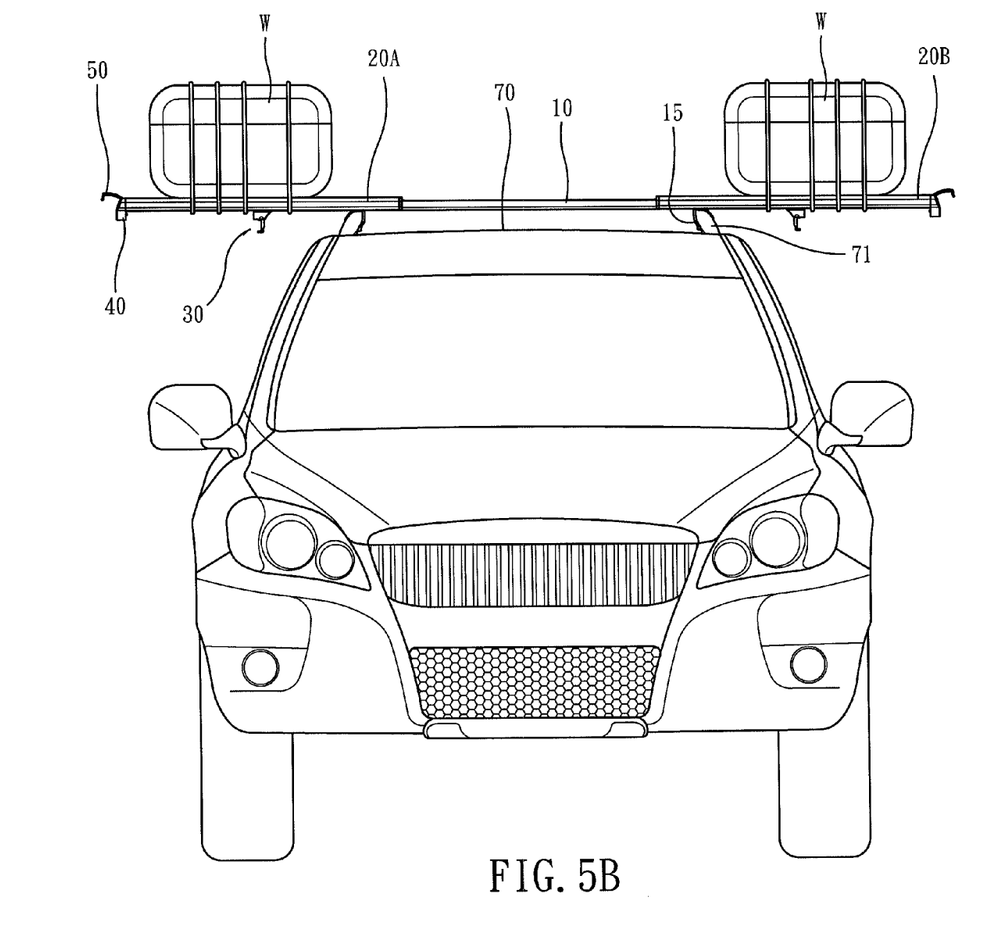
Figure 5C:
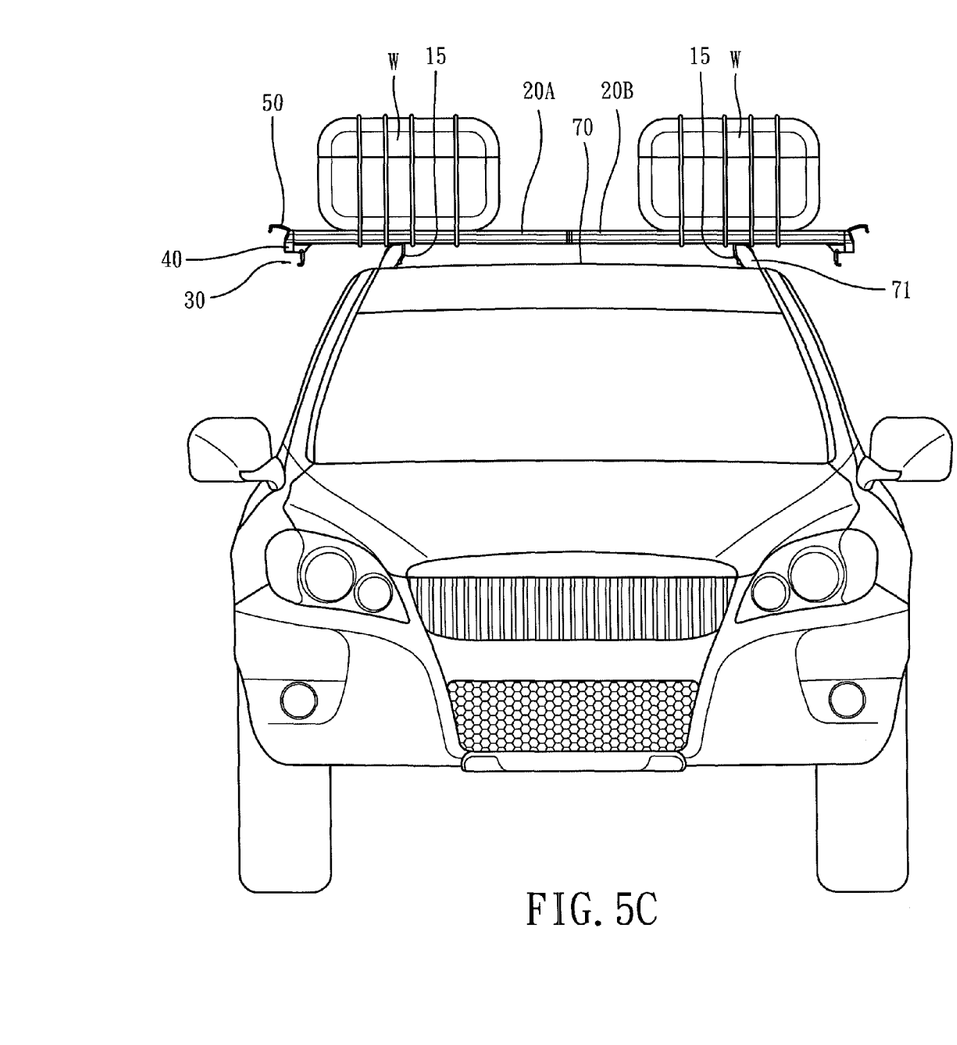
Figure 5D:
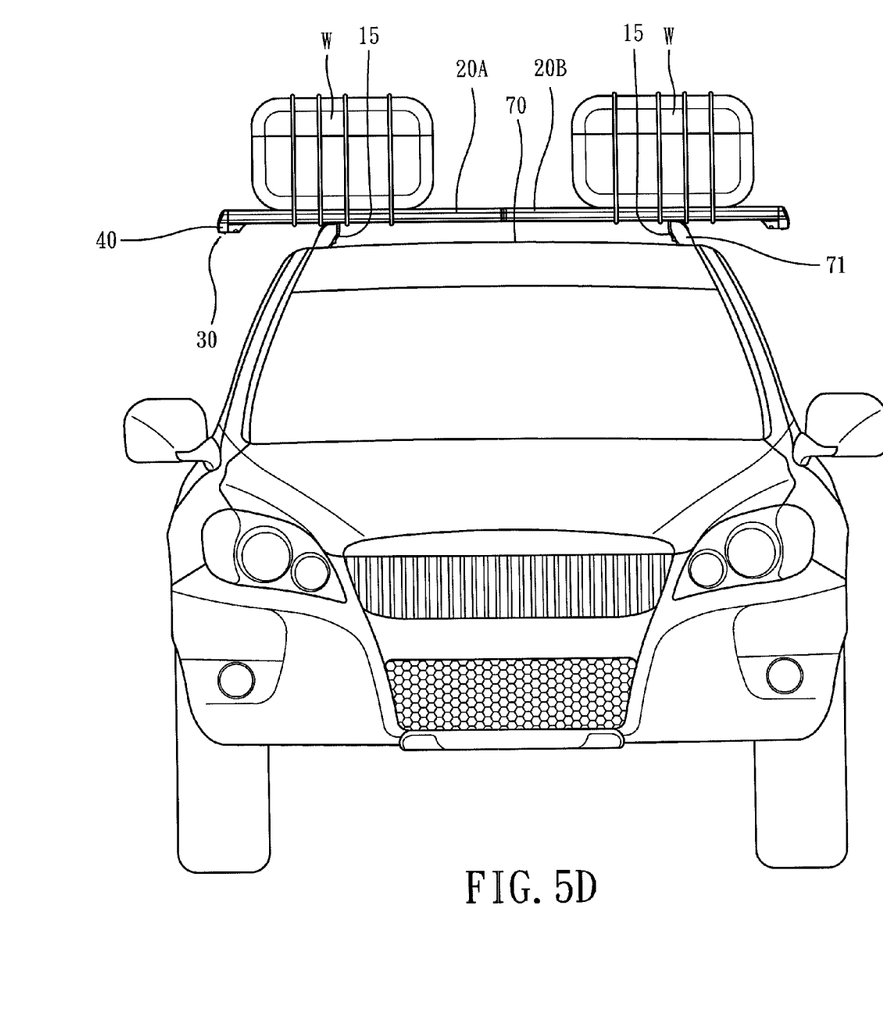

The base (10) is made by aluminum extrusion and has an elongated rectangular shape. The base (10) has two opposing ends, i.e., a left end and a right end. The two ends of the base (10) have a first through hole (11), respectively. The base (10) has a first guide portion (12) formed at front and rear sides thereof. The first guide portion (12) extends toward the two ends of the base (10). The guide portion (12) is provided with a stop bolt (13). The base (10) further has a first T-shaped trough (14) with an opening facing downward. The first T-shaped trough (14) extends to the left and right ends of the base (10). As shown in FIG. 3 and FIG. 5A, two end edges of the first T-shaped trough (14) are provided with connection units (15) to connect with left and right fixing rods (71) provided on a car roof (70).

The two carrier members (20A, 20B) are coaxially disposed on the base (10) and made by aluminum extrusion. The two carrier members (20A, 20B) have face-to-face inner ends (21) and opposing outer ends (22). Each of the two carrier members (20A, 20B) has a second T-shaped trough (23) with an opening facing upward. An outer end of the second T-shaped trough (23) is formed with a mounting through hole (24) and a second through hole (25). Each of the two carrier members (20A, 20B) has a second guide portion (26) to mate with the first guide portion (12), so that the two carrier members (20A, 20B) are confined to slide along the base (10). When the two carrier members (20A, 20B) are retracted, the second through hole (25) is aligned with the first through hole (11).

The two lock units (30) are disposed at the two ends of the base (10). Each lock unit (30) comprises a support seat, a pin member (33), a spring (34), and a control member (35). The support seat comprises an upper block (31) inserted in the first T-shaped trough (14) and a lower block (32) mounted to the bottom of the base (10). The upper block (31) and the lower block (32) have nuts (312) and lock holes (321) for connection of bolts (322), so that the upper block (31) and the lower block (32) are coupled to the two ends of the base (10). The upper block (31) has a third through hole corresponding in position to the first through hole (11). The third through hole is composed of an upper hole (311A) and a lower hole (311B), the lower hole (311B) having a diameter larger than the upper hole (311A). The lower block (32) has a recess (323) corresponding in position to the third through hole and two vertical slots (324) formed at two side walls of the recess (323). The two vertical slots (324) are adapted to receive an axle member (325). The axle member (325) is disposed across the recess (323) and movable along the vertical slots (324). The pin member (33) corresponds in shape to the third through hole. The pin member (33) has an upper part and an enlarged lower part, such that the pin member (33) is confined in the third through hole. The spring (34) is located in the lower hole (311B) of the third through hole to push the pin member (33), so that the pin member (33) can be moved downward. The control member (35) comprises a cam (351) which is located in the recess (323) and connected with the axle member (325). The pin member (33) is confined in the third through hole by the cam (351). The cam (351) has a holding surface (351A) to push the top of the pin member (33) to insert into the first and second through holes (11, 25) and an action surface (351B) to urge the top of the pin member (33) to disengage from the second through hole (25). The holding surface (351A) and the action surface (351B) are disposed at about 90 degrees. The cam (351) is further connected with a pull lever (352). The pull lever (352) has a first buckle portion (353) and a first engaging portion (354).

Figure 4A:
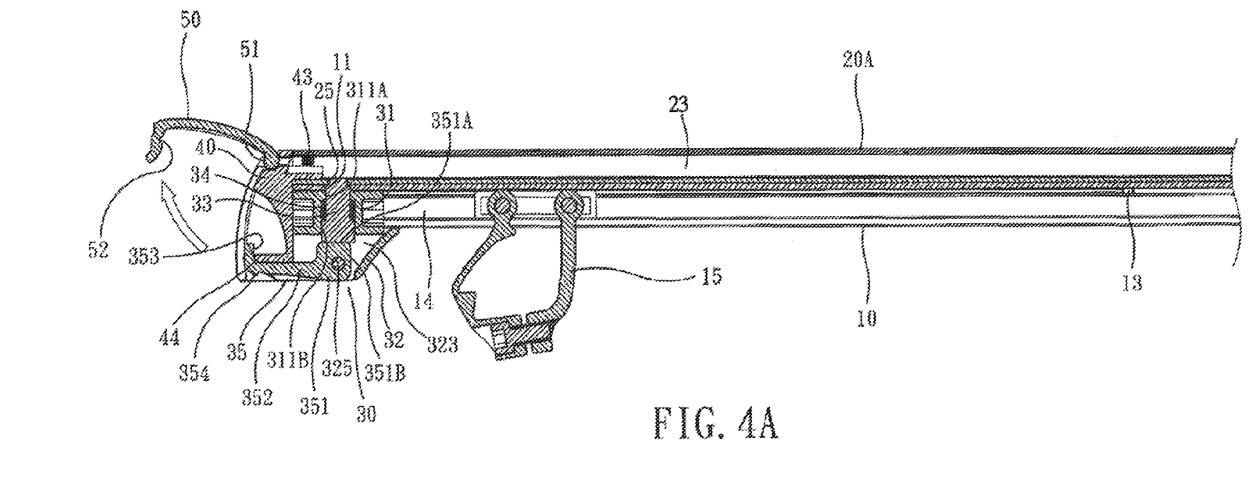
FIG. 4A is a cross-sectional view showing the movable board in a released state according to a preferred embodiment of the present invention.
Figure 4B:
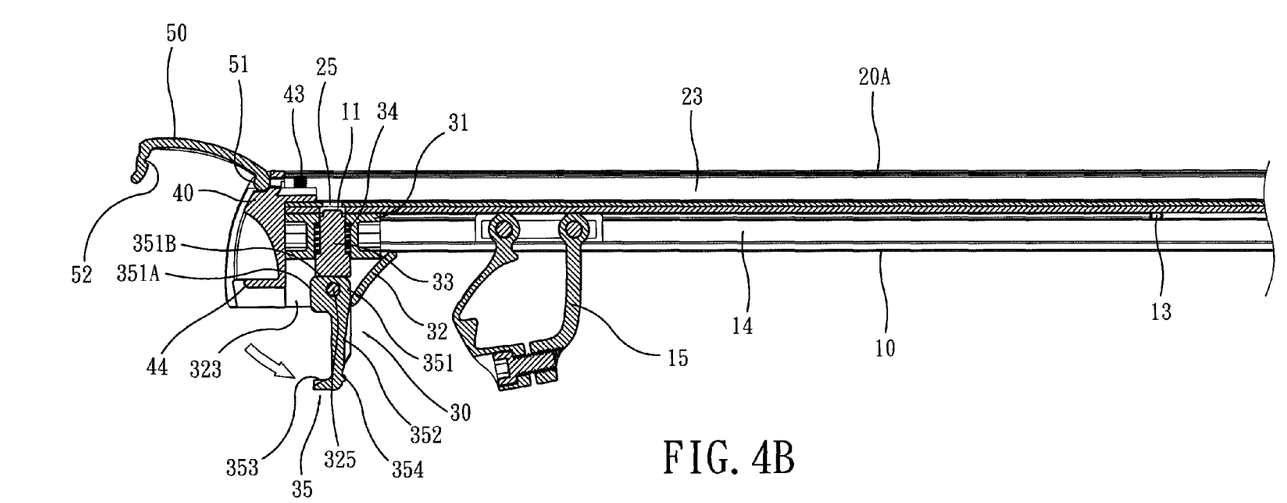
FIG. 4B is a cross-sectional view showing the lock unit and the lock seat in a released state according to a preferred embodiment of the present invention.
Figure 4C:
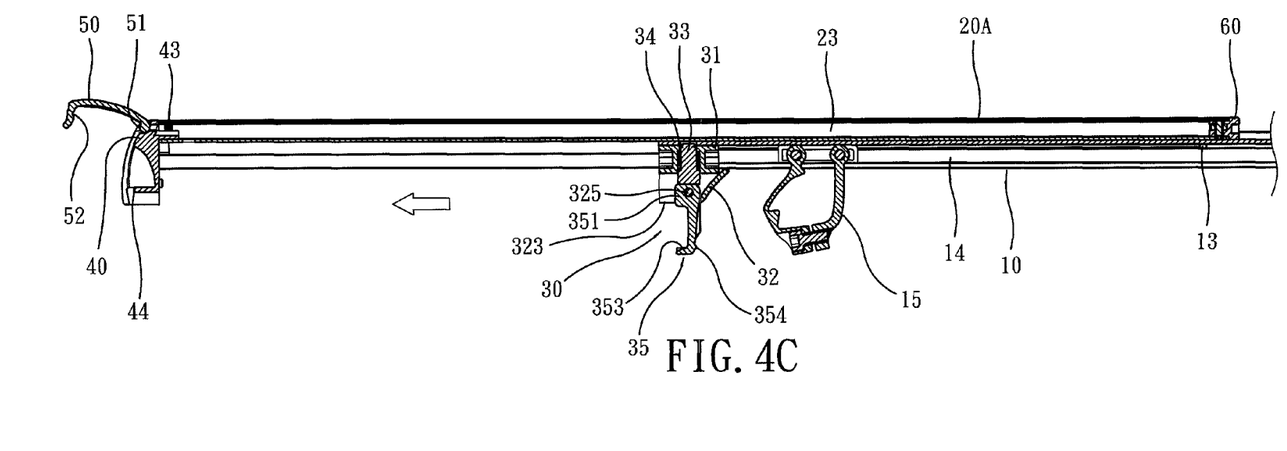
FIG. 4C is a cross-sectional view showing the carrier members maximally extended according to a preferred embodiment of the present invention.

The two lock seats (40) are disposed at the outer ends of the two carrier members (20A, 20B). Each of the two lock seats (40) has an insertion portion (41) which is inserted into the second T-shaped trough (23) and the second guide portion (26). The insertion portion (41) has a threaded hole (42) corresponding in position to the mounting through hole (24) for connection of a screw (43), such that the two lock seats (40) are secured to the outer ends of the two carrier members (20A, 20B). When the two carrier members (20A, 20B) are retracted, the lock seats (40) are flush with the respective ends of the base (10). The lock seats (40) provide a stop and positioning function for the first and second through holes (11, 25) to be aligned quickly. Each of the two lock seats (40) further has a second buckle portion (44). Referring to FIG. 3 and FIG. 4A, when the first buckle portion (353) is engaged with the second buckle portion (44), the holding surface (351A) of the cam (351) keeps the pin member (33) inserted in the first and second through holes (11, 25), so that the carrier members (20A, 20B) are secured on the base (10). As shown in FIG. 4B and FIG. 4C, when the first buckle portion (353) is disengaged from the second buckle portion (44) and the pull lever (352) is turned, the holding surface (351A) will conquer the elastic force of the spring (34) and the action surface (351B) will be moved to face the bottom of the pin member (33). At this time, the top of the pin member (33) disengages from the second through hole (25) to release the corresponding carrier members (20A, 20B), so that the carrier members (20A, 20B) are free to extend. Furthermore, each lock seat (40) has a first pivot portion (45) on a top edge thereof, as shown in FIG. 1.

The two movable boards (50) are disposed corresponding to the lock seats (40). Each of the two movable boards (50) has a second pivot portion (51) on a top edge thereof and a second engaging portion (52) at a bottom edge thereof. The second pivot portion (51) is coupled to the first pivot portion (45). The second engaging portion (52) is engaged with the first engaging portion (354). As shown in FIG. 3, after the first and second buckle portions (353, 44) are connected, the first and second engaging portions (354, 52) can be engaged with each other to maintain the connection state of the first and second buckle portions (353, 44), providing a two-step fixing feature. When the carrier members (20A, 20B) are retraced and positioned, the present invention has improved safety when the vehicle is on a bumpy road. Referring to FIG. 4A and FIG. 4B, when the user wants to extend the carrier members (20A, 20B) relative to the base (10), the movable boards (50) are pulled upward with the first and second pivot portion (45, 51) as the pivot, so that the second engaging portion (52) is disengaged from the first engaging portion (354). After that, the first and second buckle portions (353, 44) are disconnected, and the pull lever (352) is then pushed to release the carrier members (20A, 20B) so that the carrier members (20A, 20B) can be extended.

The two protection covers (60), as shown in FIG. 1 and FIG. 4C, are disposed at the inner ends (21) of the carrier members (20A, 20B). Each of the two protection covers (60) has a mating portion (61) which is inserted in the second T-shaped trough (23) and the second guide portion (26). The mating portion (61) is connected to the inner ends (21) of the carrier members (20A, 20B) by a coupling unit (62). When the carrier members (20A, 20B) are extended outward, the protection covers (60) will be stopped by the stop bolt (13) to prevent disengagement of the carrier members (20A, 20B) and the base (10).

Referring to FIG. 5A, FIG. 5B, FIG. 5C, and FIG. 5D, after the connection relationship between the lock units (30), the lock seats (40), and the movable boards (50) is released, the carrier members (20A, 20B) can be extended toward the left and right sides of the vehicle for the user to dismount or mount the articles (W) on the carrier members (20A, 20B). There is no need for the user to incline their body and reach up to take the articles. The present invention is therefore very convenient to use.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A roof rack device, comprising:

a base having two opposing ends, the two ends of the base respectively having a first through hole, the two ends being provided with connection units to connect with left and right sides of a car roof, the base further having a first guide portion extending toward the two ends of the base;

two carrier members coaxially disposed on the base, the two carrier members having respective inner ends and outer ends, the outer ends of the two carrier members respectively having a second through hole, each of the two carrier members having a second guide portion to mate with the first guide portion so that the two carrier members are confined to slide along the base, the second through hole being aligned with the first through hole when the two carrier members are retracted;

two lock units disposed at the two ends of the base, each of the two lock units comprising a support seat, a pin member and a control member, the support seat having a third through hole disposed under the first through hole, an axle member being provided to connect the control member, the pin member being confined in the third through hole, the control member having a cam to push the pin member so that a top of the pin member is moved into the first and second through holes or out of the second through hole, the control member having a first buckle portion; and two lock seats disposed at the outer ends of the two carrier members, each of the two lock seats having a second buckle portion, when the first buckle portion is engaged with the second buckle portion, the cam keeps the pin member inserted in the first and second through holes, when the first buckle portion is disengaged from the second buckle portion, the cam acts on the pin member to disengage the pin member from the second through hole.

2. The roof rack device as claimed in claim 1, wherein the base further has a first T-shaped trough with an opening facing downward, the first T-shaped trough extending to the two ends of the base.

3. The roof rack device as claimed in claim 2, wherein two end edges of the first T-shaped trough are provided with the connection units to connect with left and right fixing rods provided on the car roof.

4. The roof rack device as claimed in claim 2, wherein the support seat of each lock unit comprises an upper block inserted in the first T-shaped trough and a lower block mounted to a bottom of the base, the upper block and the lower block being coupled to the two ends of the base, the upper block having the third through hole disposed under the first through hole, the third through hole being composed of an upper hole and a lower hole, the lower hole having a diameter larger than the upper hole, the lower block having a recess corresponding in position to the third through hole and two vertical slots formed at two side walls of the recess, the two vertical slots being adapted to receive the axle member, the axle member being disposed across the recess and movable along the vertical slots, the pin member corresponding in shape to the third through hole, the pin member having an upper part and an enlarged lower part so that the pin member is confined in the third through hole, a spring being provided in the lower hole of the third through hole to push the pin member downward, the cam of the control member being located in the recess and connected with the axle member, the pin member being confined in the third through hole by the cam, the cam having a holding surface to push the top of the pin member to insert into the first and second through holes and an action surface to urge the top of the pin member to disengage from the second through hole.

5. The roof rack device as claimed in claim 4, wherein the holding surface and the action surface are disposed at about 90 degrees.

6. The roof rack device as claimed in claim 4, wherein the cam is further connected with a pull lever, the pull lever having a first buckle portion.

7. The roof rack device as claimed in claim 1, wherein when the two carrier members are retracted, the two lock seats are flush with the respective outer ends of the base, the two lock seats providing a stop function.

8. The roof rack device as claimed in claim 1, wherein the control member further has a first engaging portion and each of the lock seats has a first pivot portion, two movable boards being provided corresponding to the lock seats, each of the two movable boards has a second pivot portion, the first pivot portion being adapted for connection of the second pivot portion, each of the two movable boards further has a second engaging portion to engage with the first engaging portion, after the first and second buckle portions are connected, the first and second engaging portions are engaged with each other to maintain connection of the first and second buckle portions.

9. The roof rack device as claimed in claim 1, wherein the base is provided with a stop bolt, two protection covers are provided at the inner ends of the carrier members, when the carrier members are extended outward, the protection covers are stopped by the stop bolt to prevent disengagement of the carrier members and the base.

\* \* \* \* \*